United States Patent
Tilton et al.

(10) Patent No.: US 6,669,265 B2
(45) Date of Patent: Dec. 30, 2003

(54) MULTIDENSITY LINER/INSULATOR

(75) Inventors: Jeffrey A. Tilton, Goshen, KY (US); Thomas T. Block, Howell, MI (US); Lee A. Staelgraeve, Lambertville, MI (US); Daniel J. Eigel, Louisville, KY (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 10/160,776

(22) Filed: May 31, 2002

(65) Prior Publication Data

US 2003/0008581 A1 Jan. 9, 2003

Related U.S. Application Data

(63) Continuation-in-part of application No. 09/607,478, filed on Jun. 30, 2000.
(60) Provisional application No. 60/295,433, filed on Jun. 1, 2001.

(51) Int. Cl.[7] .................................................. B60J 5/00
(52) U.S. Cl. .................................... 296/146.1; 296/39.1
(58) Field of Search .............................. 296/39.1, 39.3, 296/146.1, 146.5; 442/181; 156/196; 428/68, 343

(56) References Cited

U.S. PATENT DOCUMENTS

| | | |
|---|---|---|
| 3,652,377 A | 3/1972 | Helmick |
| 3,752,060 A | 8/1973 | Hubert et al. |
| 3,764,454 A | 10/1973 | Healy et al. |
| 3,787,278 A | 1/1974 | Ready et al. |
| 3,936,555 A | 2/1976 | Smith, II |
| 3,975,562 A | 8/1976 | Madebach et al. |
| 4,016,318 A | 4/1977 | DiGioia et al. |
| 4,020,207 A | 4/1977 | Alfter et al. |

(List continued on next page.)

FOREIGN PATENT DOCUMENTS

| | | |
|---|---|---|
| JP | 11-180224 | 7/1999 |

*Primary Examiner*—Stephen T. Gordon
*Assistant Examiner*—H. Gutman
(74) *Attorney, Agent, or Firm*—Inger H. Eckert; Stephen W. Barns; Maris C. Gasaway

(57) ABSTRACT

A liner/insulator includes a pad of fibrous material having a lofty, acoustically insulating portion and a relatively higher density skin along a first face thereof that may function as a water barrier. The acoustical liner is a non-laminate made from polyester, polyethylene, polypropylene, polyethylene terephthalate, glass fibers, natural fibers and any mixtures thereof. For certain applications the liner/insulator may incorporate a facing on one or even two opposing faces thereof. A method of insulating a door including an exterior body panel and an interior fascia panel as well as a door for a vehicle are also provided.

28 Claims, 3 Drawing Sheets

U.S. PATENT DOCUMENTS

| | | |
|---|---|---|
| 4,131,664 A | 12/1978 | Flowers et al. |
| 4,199,635 A | 4/1980 | Parker |
| 4,242,398 A | 12/1980 | Segawa et al. |
| 4,282,283 A | 8/1981 | George et al. |
| 4,377,614 A | 3/1983 | Alfter et al. |
| 4,379,801 A | 4/1983 | Weaver et al. |
| 4,379,802 A | 4/1983 | Weaver et al. |
| 4,395,455 A | 7/1983 | Frankosky |
| 4,418,031 A | 11/1983 | Doerer et al. |
| 4,432,580 A | 2/1984 | Lohmar et al. |
| 4,539,252 A | 9/1985 | Franz |
| 4,539,254 A | 9/1985 | O'Connor et al. |
| 4,568,581 A | 2/1986 | Peoples, Jr. |
| 4,579,764 A | 4/1986 | Peoples, Jr. et al. |
| 4,711,685 A | 12/1987 | Hillman |
| 4,729,917 A | 3/1988 | Symdra et al. |
| 4,770,919 A | 9/1988 | Tesch |
| 4,824,507 A | 4/1989 | D'Amico |
| 4,888,234 A | 12/1989 | Smith et al. |
| 4,940,112 A | 7/1990 | O'Neill |
| 4,946,738 A | 8/1990 | Chenoweth et al. |
| 4,948,660 A | 8/1990 | Rias et al. |
| 4,985,106 A | 1/1991 | Nelson |
| 5,047,198 A | 9/1991 | Kim |
| 5,055,341 A | 10/1991 | Yamaji et al. |
| 5,066,351 A | 11/1991 | Knoll |
| 5,079,074 A | 1/1992 | Steagall et al. |
| 5,094,318 A | 3/1992 | Maeda et al. |
| 5,108,691 A | 4/1992 | Elliott |
| 5,164,254 A | 11/1992 | Todd et al. |
| 5,204,042 A | 4/1993 | James et al. |
| 5,283,111 A | 2/1994 | Schlecker |
| 5,296,657 A | 3/1994 | Gilliland et al. |
| 5,298,319 A | 3/1994 | Donahue et al. |
| 5,298,694 A | 3/1994 | Thompson et al. |
| 5,376,322 A | 12/1994 | Younessian |
| 5,436,046 A | 7/1995 | Sakamoto |
| 5,501,898 A | 3/1996 | Fottinger et al. |
| 5,543,193 A | 8/1996 | Tesch |
| 5,549,776 A | 8/1996 | Juriga |
| 5,591,289 A | 1/1997 | Frost et al. |
| 5,624,726 A | 4/1997 | Sanocki et al. |
| 5,633,064 A | 5/1997 | Ragland et al. |
| 5,741,380 A | 4/1998 | Hoyle et al. |
| 5,743,985 A | 4/1998 | Ernest et al. |
| 5,744,763 A | 4/1998 | Iwasa et al. |
| 5,749,993 A | 5/1998 | Denney et al. |
| 5,756,026 A | 5/1998 | Sanchez et al. |
| 5,759,659 A | 6/1998 | Sanocki et al. |
| 5,800,905 A | 9/1998 | Sheridan et al. |
| 5,817,408 A | 10/1998 | Orimo et al. |
| 5,841,081 A | 11/1998 | Thompson et al. |
| 5,872,067 A | 2/1999 | Meng et al. |
| 5,886,306 A | 3/1999 | Patel et al. |
| 5,932,331 A | 8/1999 | Jones et al. |
| 5,958,603 A | 9/1999 | Ragland et al. |
| RE36,323 E | 10/1999 | Thompson et al. |
| 5,961,904 A | 10/1999 | Swan et al. |
| 5,972,445 A | 10/1999 | Kimura et al. |
| 5,975,609 A | 11/1999 | Campbell |
| 5,979,962 A | 11/1999 | Valentin et al. |

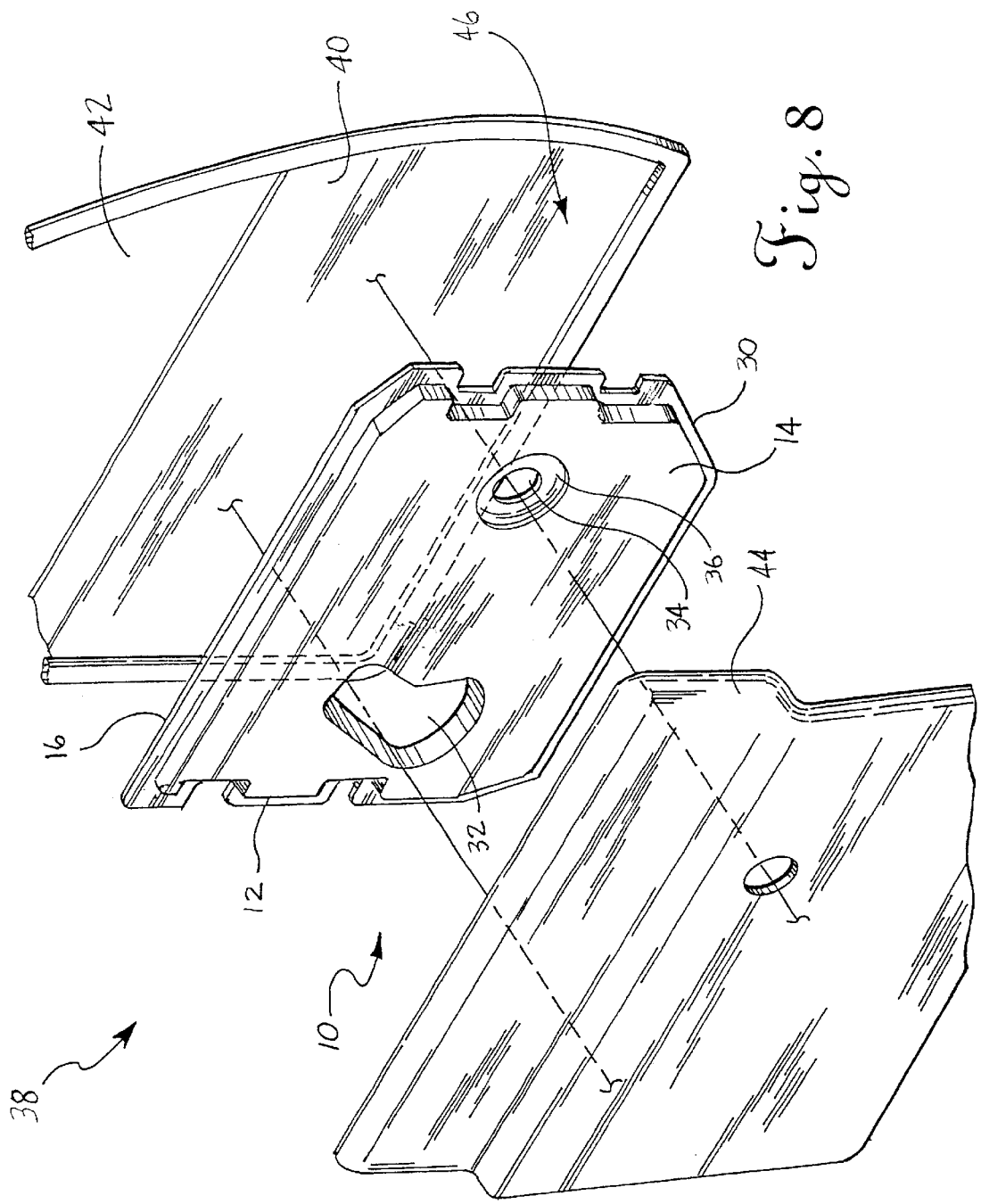

MULTIDENSITY LINER/INSULATOR

This is a continuation-in-part of pending U.S. patent application Ser. No. 09/607,478, filed Jun. 30, 2000.

TECHNICAL FIELD AND INDUSTRIAL APPLICABILITY OF THE INVENTION

The present invention relates generally to a multilayer acoustical and thermal liner/insulator which may be utilized to insulate an environment such as a passenger compartment of a vehicle from the heat and sound generated by mechanical components of that vehicle during its operation. Further uses include application in insulating appliances such as dishwashers and clothes dryers and providing sound and thermal insulation for furnaces, air conditioning units and ductwork in buildings including homes, offices and industrial structures.

BACKGROUND OF THE INVENTION

Acoustical insulation is well known in the art. Acoustical insulation typically relies upon both sound absorption, i.e. the ability to absorb incident sound waves, and transmission loss, i.e. the ability to reflect incident sound waves, in order to provide sound attenuation. One of the more prevalent uses of such insulation is in the motorized vehicle field where engine compartments, fire walls, fender wells, doors, floor pans and other components of the passenger compartment shell are commonly acoustically insulated to reduce engine and road noise for the benefit and comfort of passengers.

Mats of high temperature glass fibers have also been utilized, e.g. (a) on the fire wall between the dashboard and engine compartment and (b) along the floor pan of the vehicle between the passenger compartment and the drive line and exhaust system. These materials provide heat insulation which makes it possible to maintain cooler and more comfortable temperatures in the operator/passenger compartment particularly during the summer months. Additionally, these materials provide needed sound insulation, reducing or eliminating various mechanical sounds of the motor, drive train as well as the suspension and tires as the vehicle travels over the often rough and bumpy surface of the roadway.

Various methods of manufacturing or fabricating such acoustical and thermal insulators are known in the art. Examples of these methods are found, for example, in U.S. Pat. No. 5,055,341 to Yamaji et al. and U.S. Pat. No. 5,501,898 to Fottinger et al.

In the Yamaji et al. patent, woven and/or non-woven fabrics are laminated to a composite of fibers and thermal plastic resin. In the Fottinger et al. patent, a multilayer, multi-density composite is disclosed incorporating polyester fibers. The fibers are preheated in a furnace by metal plates above the melting point of the fibers. The non-woven fabric fiber layers are loaded into a molding tool and exposed to molding pressure for a dwell time sufficient to complete the molding process. The part is then cooled below the softening temperature of the fibers to set the composite in the final molded shape.

Various additional examples of acoustical insulation commonly employed for vehicle applications are found in U.S. Pat. Nos. 5,298,694 to Thompson et al., 5,624,726 to Sanocki et al., 5,759,659 to Sanocki et al. and 5,961,904 to Swan et al.

The Thompson et al. patent discloses a non-woven acoustical insulation web of thermoplastic fibers and a second layer, such as a scrim, non-woven fabric, film or foil, laminated thereto for water barrier protection.

The Sanochi et al. patents disclose an acoustical insulation blanket in the form of a composite featuring an insulation layer of fibrous insulation, foam insulation or a combination thereof and a high temperature-resistant layer of ceramic paper, woven ceramic fibers, woven fiberglass fibers, ceramic non-woven scrims or fiberglass non-woven scrims encased in a heat sealable thermoplastic polyolefin which functions as a moisture barrier.

The Swan et al patent discloses a non-woven acoustical insulation web of thermally stabilizing melt-blown polypropylene microfibers which may also contain staple fibers such as crimped bulking fibers and/or binder fibers. The acoustical insulation web is formed as a laminate with a water barrier layer of planer thermoplastic polyolefin film such as polyethylene, polypropylene and ethylene-propylene copolymer films.

In other instances, manufacturers have utilized one or more layers of ethylene vinyl acetate and/or polyvinyl chloride to provide the desired moisture barrier. The added water barrier layer(s) often add significant weight to the insulation product. This is a very significant disadvantage to vehicle manufacturers seeking to reduce overall vehicle weight and increase fuel economy.

In many acoustical insulation applications and particularly those relating to motorized vehicles, water barrier protection is a critical concern. As demonstrated by these prior art patents, it has generally been found necessary to add water barrier protection to the acoustical insulation material since this material is otherwise too pervious to water and allows water intrusion. Toward this end it has been common practice to provide laminate constructions which are effective for the intended purpose but suffer several shortcomings. Specifically, as a result of handling and manipulation during installation and/or deleterious and degradating effects of various environmental factors over time, delamination commonly occurs. This delamination typically reduces the effectiveness of the water barrier thereby potentially allowing for unwanted water intrusion by wicking and capillary action. A need is therefore identified for an improved insulation providing enhanced acoustical and thermal insulating properties and dependable water barrier protection over an extended service life all in a light weight product suitable for use even in compact and subcompact vehicles.

SUMMARY OF THE INVENTION

In accordance with the purposes of the present invention as described herein, an improved acoustical and thermal liner/insulator of enhanced performance characteristics is provided. The liner/insulator includes a pad of fibrous material having a lofty, acoustically insulating portion having a density of between substantially 8.0–80.0 kg/m$^3$. The liner/insulator also includes a relatively higher density skin along at least one face thereof. The skin has a thickness of between substantially 0.25–10.0 mm and a density of between substantially 32.0–1600.0 kg/m$^3$.

The fibrous material of the liner/insulator is selected from a group consisting of (a) thermoplastic polymer staple fibers and thermoplastic bicomponent fibers,(b) glass staple fibers and thermoplastic bicomponent fibers and (c) a combination of (a) and (b). The fibrous material may be polyester, polyethylene, polypropylene, polyethylene terephthalate, glass fibers, natural fibers and any mixtures thereof.

The pad is a nonlaminate and, accordingly, the potential for the relatively higher density skin to delaminate from the remainder of the pad is eliminated. In one embodiment of the invention, the pad includes a higher density skin along a second face thereof as well. In yet another embodiment, the liner/insulator includes a first facing layer along a first face thereof. In still another embodiment, the liner/insulator includes a second facing along a second face thereof. The first and second facings may be constructed from polyester, rayon, metallic foil and any mixtures thereof.

In accordance with another aspect of the present invention, an acoustical liner with integral water barrier is provided. The acoustical liner comprises a pad of fibrous material having a lofty, acoustically insulating portion having a density of between substantially 8.0–80.0 kg/m$^3$ and a relatively higher density, water-barrier skin along at least one face thereof. The skin has a thickness of between substantially 0.254–7.5 mm and a density between approximately 32.0–1600.0 kg/m$^3$. The pad is formed from fibrous materials selected from a group consisting of polyester, polyethylene, polypropylene, polyethylene terephthalate, glass fibers, natural fibers and any mixtures thereof. The pad and heat-seared, water-barrier skin are integral and, accordingly, the acoustical liner is a non-laminate. As such, it avoids any tendency to delaminate as is characteristic of the water barrier layers laminated to acoustical insulation materials commonly employed in the prior art.

The acoustical liner with integral water barrier may further include a crimped margin around at least a portion of the periphery of the pad where the crimped margin has a thickness of at least about 0.5–3.0 mm. This margin provides additional strength and a suitable location to mount the liner to, for example, a door panel or other structural component of a vehicle requiring acoustical insulation by means of mechanical fasteners of a nature known in the art.

Of course, the pad of the acoustical liner with integral water barrier may also include two heat-seared skins. Additionally, the pad may include one or more facing layers composed of polyester, rayon, metallic foil and any mixtures thereof.

In accordance with yet another aspect of the present invention a method of insulating a door including an exterior body panel and an interior fascia panel defining a cavity therebetween is provided. The method comprises the placing of a pad of fibrous material in the cavity between the exterior body panel and the interior fascia panel. The pad has a lofty, acoustically insulating portion having a density of substantially 8.0–80.0 kg/m$^3$ and a relatively higher density skin along at least one face thereof having a density of between substantially 0.25–7.5 mm.

In accordance with yet another aspect of the present invention a door for a vehicle is provided. The door includes an exterior body panel, an interior fascia panel connected to the exterior body panel and defining a cavity therebetween and a pad of fibrous material having a lofty, acoustically insulating portion having a density of substantially 8.0–80.0 kg/m$^3$ and a relatively higher density, water-barrier skin along at least one face thereof. That skin has a thickness of between substantially 0.25–7.5 mm. That pad is formed from fibrous materials selected from a group consisting of polyester, polyethylene, polypropylene, polyethylene terephthalate, glass fibers, natural fibers and any mixtures thereof. The pad is a nonlaminate and may also include a crimped margin around at least a portion of the periphery of the pad where the crimped margin has a thickness of at least about 0.5–3.0 mm. As noted above, this crimped margin provides a convenient fastening point for securing the acoustical liner to the exterior and/or interior panels of the door or other component to which the acoustical liner is to be secured. The pad of the acoustical liner may also include two heat-seared skins.

In accordance with still another aspect of the present invention, a liner for an airstream conduit, such as a heating and air conditioning duct, or a housing such as for a furnace or air conditioning unit, is provided. That liner comprises a pad of fibrous material having a lofty, acoustically insulating portion having a density of between about 8.0–80.0 kg/m$^3$. That liner also includes a relatively higher density skin along at least one face thereof. The skin has a thickness of between about 0.25–10.00 mm and a density of between about 32.0–1600.0 kg/m$^3$. The liner may be formed from polyester, polyethylene, polypropylene, polyethylene terephthalate, glass fibers, natural fibers and any mixtures thereof. The liner may also include a second skin and, if desired for any particular application, one or more facings. The facings may be constructed from polyester, rayon, metallic foil and any mixtures thereof.

Still other objects of the present invention will become apparent to those skilled in this art from the following description wherein there is shown and described preferred embodiments of this invention, simply by way of illustration of several of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 8 is an exploded perspective view of a vehicle door constructed in accordance with the teachings of the present invention.

Reference will now be made in detail to the present preferred embodiments of the invention, examples of which are illustrated in the accompanying drawing.

DETAILED DESCRIPTION AND PREFERRED EMBODIMENTS OF THE INVENTION

Figure 1:
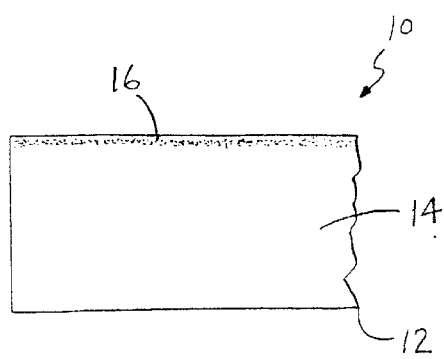
FIG. 1 is an end elevational view of a liner/insulator of the present invention including a relatively higher density skin along one face.

Reference is now made to FIG. 1 which illustrates a first embodiment of the liner/insulator of the present invention generally designated by reference numeral 10. The liner/insulator 10 includes a pad 12 of fibrous material. The fibrous material may take the form of (a) thermoplastic polymer staple fibers and thermoplastic bicomponent fibers, (b) glass staple fibers and thermoplastic bicomponent fibers and (c) a combination of (a) and (b). The thermoplastic staple fibers and bicomponent fibers may be selected from a group of materials including but not limited to polyester, polyethylene, polypropylene, polyethylene terephthalate and any mixtures thereof. The glass fibers may include E-glass, S-glass or basalt fibers. Natural fibers (e.g. hemp, kenaf) may also be included.

The pad 12 includes a lofty, acoustically insulating portion 14 having a density of between substantially 8.0–80.0 kg/m$^3$ and a relatively higher density skin 16 along one face thereof. The skin 16 has a thickness of between substantially 0.25–10.0 mm and a density of between substantially 32.0–1600.0 kg/m$^3$. The density of the skin 16 may be substantially constant throughout its thickness or it may vary gradually lower from a maximum density along the outer face thereof to a density just above that of the insulating portion 14 along the inner portion thereof. Where the density of the skin 16 varies, the average density for the skin falls within the indicated range.

In accordance with an important aspect of the present invention, the pad 12 including both the relatively lower density insulating portion 14 and the relatively higher density skin 16 is formed from a single, unitary sheet of fibrous starting material. As such, the pad 12 is a nonlaminate and, accordingly, there is no tendency for the skin 16 to delaminate from the insulating portion 14 under any environmental conditions to which the liner/insulator is likely to be subjected. The skin 16 provides the pad 12 with added mechanical strength and rigidity which aids in handling the liner/insulator 10 during installation on an apparatus or component, such as a vehicle body component, furnace or air conditioning unit housing or ductwork being insulated.

For many applications, the skin 16 functions to maintain the integrity and acoustical and thermal insulating performance of the liner/insulator 10 over a long service life. More specifically, the skin 16 provides extra mechanical support. Further, the increased density of the skin 16 closes the pores of the material making it impervious to many potential environmental contaminants which might otherwise degrade the performance of the liner/insulator over time. Thus, it should be appreciated that the skin 16 effectively functions to protect the insulating portion 14 in much the same manner as a laminated facing material does in prior art liner/insulator designs. Such prior art facing layers inherently have the potential to delaminate and fail. This is a significant drawback when one considers the harsh operating environments to which such liners and insulators are often exposed. Advantageously, the present invention eliminates this risk of delamination which potentially could otherwise lead to liner/insulator failure.

Figure 2:
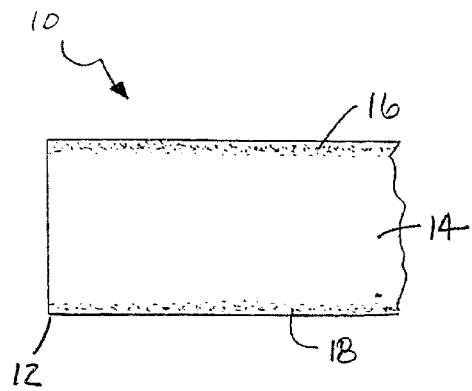
FIG. 2 is an end elevational view of another embodiment of the invention including two relatively higher density skins along two opposing faces thereof.

As illustrated in FIG. 2, another embodiment of the liner/insulator 10 includes the pad 12 with the lofty, acoustically insulating portion 14 and the skin 16 as described above for the FIG. 1 embodiment. In addition, the FIG. 2 embodiment includes a second skin 18 along the opposing face of the pad 12. The second skin 18 may have the same physical attributes described above for the first skin 16. The two skins 16, 18 may, however, vary from each other in thickness and/or density within the indicated ranges.

Figure 3:
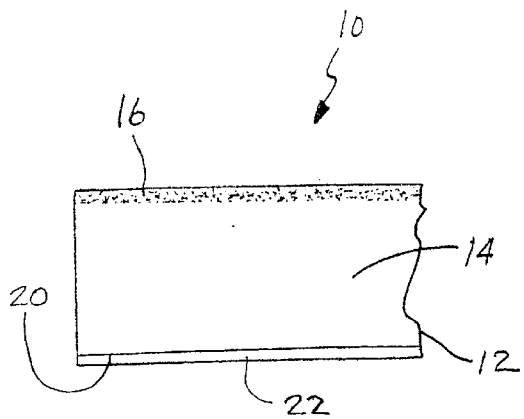
FIG. 3 is an end elevational view of yet another embodiment of the present invention including one relatively higher density skin along one face and a facing along the opposite face thereof.

As illustrated in FIG. 3, an additional embodiment of the liner/insulator 10 includes the pad 12 with the lofty, acoustically insulating portion 14 and the skin 16 as described above with respect to the FIG. 1 embodiment. In this embodiment, the face 20 of the pad opposite the skin 16 carries a facing layer 22. The facing layer 22 may be made from polyester, rayon, metallic foil and any mixtures thereof. Such a facing layer 22 may be employed for an aesthetic, decorative purpose or for a utilitarian purpose such as heat reflection and dissipation.

Figure 4:
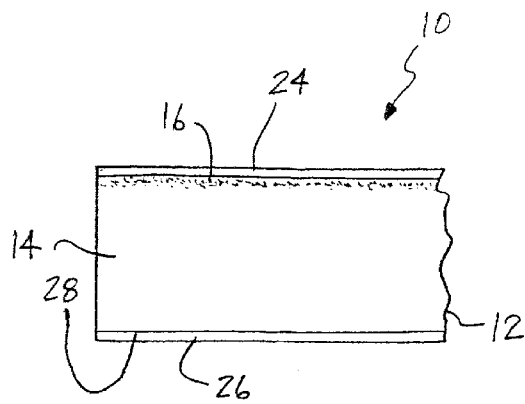
FIG. 4 is an end elevational view illustrating still another embodiment of the invention with a facing covering a relatively higher density skin along one face and a second facing covering the opposite face.

Still another possible embodiment of the present invention is illustrated in FIG. 4. The liner/insulator 10 of FIG. 4 includes a pad 12, a lofty, insulating portion 14 and a skin 16 just as described above with respect to the FIG. 1 embodiment. In addition, the liner/insulator 10 includes a first facing layer 24 covering the skin 16 and a second facing layer 26 covering the opposite face 28 of the pad 12. The two facing layers may be made from polyester, rayon, metallic foil and any mixtures thereof. Of course, a multilayer facing material may also be used.

In applications requiring superior heat insulative characteristics, the facing layer 22, 24 and/or 26 may be formed from a heat reflective material such as a metallic foil (e.g. aluminum or other heat reflective metal). Where a metallic foil is used foil thickness is generally in the range of 0.25–7.5 mm. The thickness selected is based upon the temperature, durability and structural requirements of the particular product application.

The facing layer 22, 24 and/or 26 may be reinforced or non-reinforced. Reinforcements are included to add durability and structural integrity. Reinforcements may take the form of fibrous scrims, fibrous mats or fibrous webs. For many applications, the reinforcement is made from a relatively strong fiber such as fiberglass. Typically, glass fiber threads are arranged in a criss-cross pattern. The number of threads per inch can be adjusted to provide the desired product properties. The fiber reinforcement strands are regularly spaced across the web and cross-web directions of the foil. Typically, spacing patterns include but are not limited to 4×4 (four strands per inch in both directions), 3×3, 2×2, 4×2 and 3×2. Typical patterns are rectangular and diamond. The strands may be materials other than glass which provide the desired properties (e.g. polyester).

Alternative reinforcement materials for the facing layer 22, 24 and/or 26 include but are not limited to glass mats, polymer mats and blended mats. The reinforcement may be preattached to the metallic foil. Alternatively loose laid reinforcement may be utilized. In most applications, the foil layer reinforcement provides improved tear resistance, strength and/or acoustical insulating properties. However, in many applications, it should be appreciated that no reinforcement is necessary.

The facing layer 22, 24 and/or 26 (reinforced or non-reinforced) is attached to the polymer based pad 12 by means of a heat activated adhesive. The adhesive utilized may be a thermoplastic sheet or thermoplastic web material that tends to melt and flow at temperatures between 200–350° F. Adhesives of this type are desirable because they can be activated during the molding phase of production. Besides thermoplastic sheets and webs, adhesives such as hot melts, latex and various heat activated resins may be utilized. The adhesive may be a separate layer as illustrated or the adhesive may already be attached to the facing layer 22, 24 and/or 26 in a dot matrix (i.e. uniform) or sintered (i.e. random) pattern.

Figure 5:
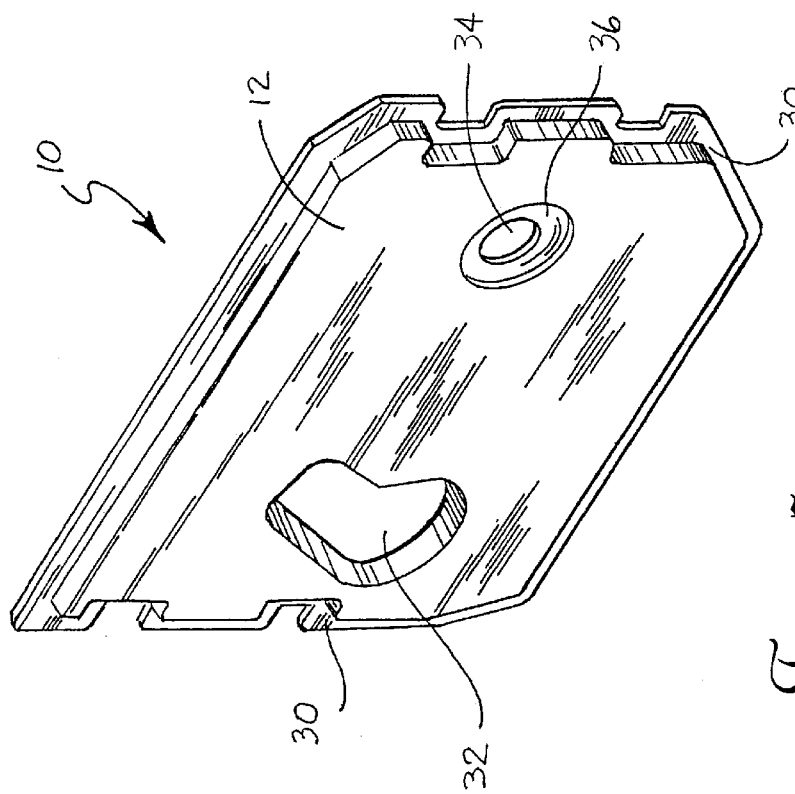
FIG. 5 is a perspective view of an acoustical liner with an integral water barrier.

An acoustical liner 10 with integral water barrier, such as shown in FIG. 5, is just one possible product of the present invention. The acoustical liner 10 includes a pad 12 of fibrous material. The pad 12 is constructed from material characterized by the ability to absorb incident sound waves and the ability to reflect incident sound waves so that the material provides excellent sound attenuation. Accordingly, the pad 12 may be constructed from a group of materials including polyester, polyethylene, polypropylene, polyethylene terephthalate, glass fibers, natural fibers and any mixtures thereof.

Figure 6:
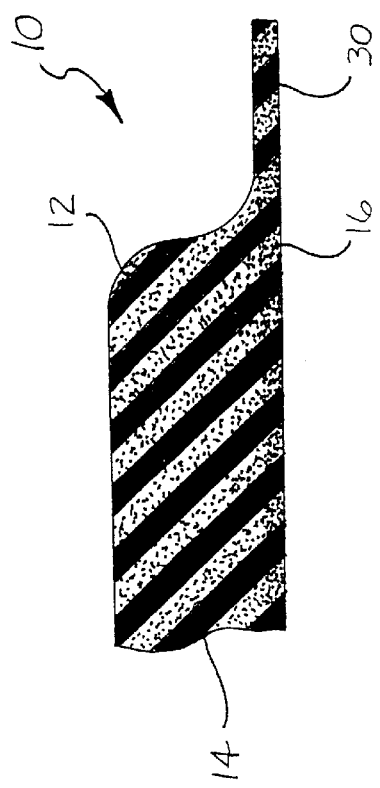
FIG. 6 is a detailed cross sectional view of the acoustical liner shown in FIG. 5.

As shown in FIG. 6, the pad 12 includes a lofty, acoustically insulating portion 14 having a density of between about 8.0–80.0 kg/m$^3$ and a heat-seared skin 16 of increased density that resists water permeation and functions as a water barrier. The face 16 has a thickness of between substantially 0.25–7.5 mm and preferably has a density on the order of approximately 32.0–1600.0 kg/m$^3$.

The insulating portion 14 and skin 16 are integrally formed during the manufacturing process and as such the liner 10 is a nonlaminate. Since the liner 10 does not comprise layers held together by adhesive it does not suffer from any tendency to delaminate and, therefore, it provides reliable and dependable water-barrier protection and acoustically insulating properties over a long service life.

A crimped margin 30 is provided around at least a portion of the outer periphery of the pad 12. The crimped margin 30 may have a thickness of about 0.5–3.0 mm. The material in the crimped margin 30 is compressed so as to be characterized by a relatively higher density. Accordingly, the crimped margin 30 is stronger and, therefore, better suited to hold mechanical fasteners (not shown) such as screws and plastic snap rivets of a type well known in the art utilized to secure insulation sheeting to vehicle panels or the like.

As shown, the liner 10 may also include various cutout openings 32, 34 in the body thereof to accommodate door operating structures such as door latch handle and window operating mechanisms. A crimped margin 36 similar to the crimped margin 30 may be provided around one or more of these openings and has been illustrated in the drawing FIG. 5 around the opening 34.

Figure 7:
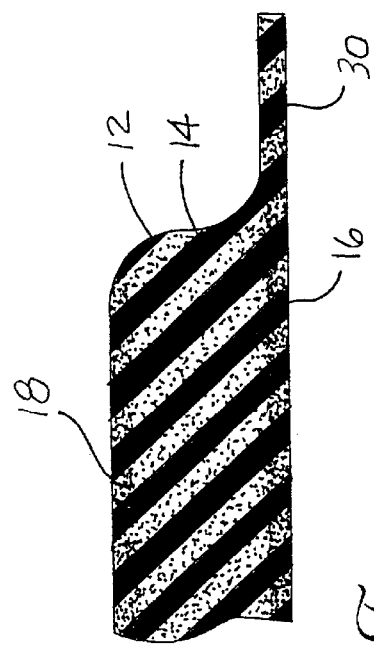
FIG. 7 is a detailed cross-sectional view of an alternative embodiment showing an acoustical liner with two, opposed relatively higher density skins.

In an alternative embodiment of the liner 10 shown in FIG. 7, a second, heat-seared skin 18 is provided opposite the first, heat-seared skin 16. While not explicitly shown, it should be appreciated that the edges of the liner 10 may also be heat-seared in order to enhance water-barrier protection in applications where water-barrier protection is of critical importance.

The construction of a door 38 of a vehicle is shown in FIG. 8. The door 38 generally comprises an exterior body panel 40 including a window opening 42 and an interior fascia panel 44. A cavity 46 is defined between the two panels 40, 44 when they are secured together. A liner 10 of the type described above and shown in detail in FIGS. 5, 6 or 7 including a pad 12 having a lofty, acoustically insulating portion 14 and at least one heat-seared, water-barrier skin 16 is placed in the cavity 46. More specifically, the liner 10 may be secured by mechanical fasteners or other means of a type known in the art to either the exterior panel 40 or the interior panel 46 of the door 38.

A number of different techniques may be utilized to manufacture the liner/insulator 10 of the present invention. The liner/insulator 10 may be prepared by differential heating and uniform compression. As a specific example, the liner 10 shown in FIG. 6 is prepared by heating one side of the blanket or pad 12 of insulation material, i.e. the side to include the heat-seared, water-barrier skin 16, while the other side remains relatively cool. A pressure is then applied for sufficient time to allow the polymer binding fiber to soften near the hot surface but not near the cold surface. When this occurs under compression, the hot side is reshaped into a higher density layer or skin. The cool side of the polymer binding fiber does not soften and, therefore, when the pressure is removed, it retains most of its original thickness and density characteristics. This technique may be performed in a standard molding press where one platen runs hot and the other runs cool.

In an alternative technique, two polymer binding fibers having significantly different softening points are utilized. In one approach, two separate blanket layers are produced each utilizing a different softening point polymer fiber. The two layers are brought together in a molding operation utilizing differential heating and compressed to a given gap width for a given length of time and at a given temperature differential. The blanket layer with the lower softening point polymer binding fiber is placed next to the hot platen and the higher softening blanket layer is placed next to the cool platen. When compression occurs, a higher density layer or skin 16 is formed from the lower softening point blanket layer while the higher temperature layer is unaffected and retains its original density. The layers are otherwise fused so as to have an integral construction.

In an alternative approach, the blanket layer with the higher melting point polymer fiber is preformed and then that layer is fed back through the forming oven during formation of the lower melting point blanket. Since the oven is running at a temperature cooler than that required to activate the higher softening polymer binding fiber, it undergoes compression in the oven but retains its original thickness and density upon exiting the oven. The lower softening point material also undergoes compression and since the oven is at a temperature sufficient to activate its polymer binding fiber, it is squeezed down to a high density layer, and the two layers are fused together as one. Additional information respecting the manufacturing of the liners/insulators 10 of the present invention may be gleaned from a review of copending U.S. patent application Ser. No. 09/607,478 filed Jun. 30, 2000, the full disclosure of which is incorporated herein by reference.

The foregoing description of preferred embodiments of the invention has been presented for purposes of illustration and description. It is not intended to be exhaustive or to limit the invention to the precise form disclosed. Obvious modifications or variations are possible in light of the above teachings. For example, the liner/insulator 10 could include two skins, both covered by a facing layer. The liner/insulator 10 could include only one skin covered by a facing layer. The liner/insulator 10 may include a skin along one or more of its edges.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A liner, comprising: a pad of fibrous material having a lofty, acoustically insulating portion having a density of between substantially 8.0–80.0 kg/m$^3$ and a relatively higher density skin along a first face thereof, said skin having a thickness of between substantially 0.25–10.0 mm and a density of between substantially 32.0–1600.0 kg/m$^3$, said fibrous material being selected from a group consisting of (a) thermoplastic polymer staple fibers and thermoplastic bicomponent fibers, (b) glass staple fibers and thermoplastic bicomponent fibers and (c) a combination of (a) and (b).

2. The liner of claim 1, wherein said fibrous material is selected from a group of materials consisting of polyester, polyethylene, polypropylene, polyethylene terephthalate, glass fibers, natural fibers and any mixtures thereof.

3. The liner of claim 1, wherein said pad includes a second face, said relatively higher density skin also being provided along said second face thereof.

4. The liner of claim 3, wherein said liner includes a first facing layer carried on said first face of said pad.

5. The liner of claim 4, wherein said liner includes a second facing layer carried on said second face of said pad.

6. The liner of claim 5, wherein said first and second facing layers are formed from a material selected from a group consisting of polyester, rayon, metallic foil and mixtures thereof.

7. An acoustical liner with integral water barrier, comprising a nonlaminate pad of fibrous material having a lofty, acoustically insulating portion having a density of between substantially 8.0–80.0 kg/m$^3$ and a relatively higher density, water-barrier skin along a first face thereof, said skin having a thickness of between substantially 0.25–7.5 mm and a density of between approximately 32.0–1600.0 kg/m$^3$.

8. The acoustical liner with integral water barrier of claim 7, wherein said fibrous material is selected from a group consisting of polyester, polyethylene, polypropylene, polyethylene terephthalate, glass fibers, natural fibers and any mixtures thereof.

9. The acoustical liner with integral water barrier of claim 7, wherein said pad includes a second face, said relatively higher density skin also being provided along said second face thereof.

10. The acoustical liner with integral water barrier of claim 9, wherein said liner includes a first facing layer carried on said first face of said pad.

11. The acoustical liner with integral water barrier of claim 10, wherein said liner includes a second facing layer carried on said second face of said pad.

12. The acoustical liner with integral water barrier of claim 11, wherein said first and second facing layers are formed from a material selected from a group consisting of polyester, rayon, metallic foil and any mixtures thereof.

13. A door for a vehicle, comprising:

an exterior body panel;

an interior fascia panel connected to said exterior body panel and defining a cavity between said exterior body panel and said interior fascia panel; and a nonlaminate pad of fibrous material having a lofty, acoustically insulating portion having a density of between substantially 8.0–80.0 kg/m$^3$ and a relatively higher density skin along a first face thereof, said skin having a thickness between substantially 0.25–7.5 mm and a density of between approximately 32.0–1600.0 kg/m$^3$.

14. The door of claim 13, wherein said fibrous material is selected from a group consisting of polyester, polyethylene, polypropylene, polyethylene terephthalate, glass fibers, natural fibers and any mixtures thereof.

15. The door of claim 13, wherein said pad includes a second face, said relatively higher density skin also being provided along said second face thereof.

16. The door of claim 15, wherein a first facing layer is carried on said first face of said pad.

17. The door of claim 16, wherein a second facing layer is carried on said second face of said pad.

18. The door of clam 17, wherein said first and second facing layers are formed from a maferial selected from a group consisting of polyester, rayon, metallic foil and mixtures thereof.

19. A liner for an airstream conduit or housing, comprising:

a nonlaminate pad of fibrous material having a lofty, acoustically insulating portion having a density of between substantially 8.0–80.0 kg/m$^3$ and a relatively higher density skin along a first face thereof, said skin having a thickness of between substantially 0.25–10.0 mm and a density of between substantially 32.0–1600.0 kg/m$^3$.

20. The liner of claim 19, wherein said fibrous material is selected from a group consisting of polyester, polyethylene, polypropylene, polyethylene terephthalate, glass fibers, natural fibers and any mixtures thereof.

21. The liner of claim 19, wherein said pad includes a second face, said relatively higher density skin also being provided along said second face thereof.

22. The liner of claim 21, wherein said liner includes a first facing layer carried on said first face of said pad.

23. The liner of claim 22, wherein said liner includes a second facing layer carried on said second face of said pad.

24. The liner of claim 23, wherein said first and second facing layers are formed from a group consisting of polyester, rayon, metallic foil and mixtures thereof.

25. A liner, comprising:

a nonlaminate pad of fibrous material having a lofty, acoustically insulating portion having a density of between substantially 8.0–80.0 kg/m$^3$ and a relatively higher density skin along a first face thereof, said skin having a thickness of between substantially 0.25–10.0 mm and a density of between substantially 32.0–1600.0 kg/m$^3$.

26. An acoustical liner with integral water barrier, comprising a pad of fibrous material having a lofty, acoustically insulating portion having a density of between substantially 8.0–80.0 kg/m$^3$ and a relatively higher density, water-barrier skin along a first face thereof, said skin having a thickness of between substantially 0.25–7.5 mm and a density of between approximately 32.0–1600.0 kg/m$^3$, further including a crimped margin, said crimped margin having a thickness of about 0.5–3.0 mm.

27. A door for a vehicle, comprising:

an exterior body panel;

an interior fascia panel connected to said exterior body panel and defining a cavity between said exterior body panel and said interior fascia panel; and a pad of fibrous material having a lofty, acoustically insulating portion having a density of between substantially 8.0–80.0 kg/m$^3$ and a relatively higher density skin along a first face thereof, said skin having a thickness between substantially 0.25–7.5 mm and a density of between approximately 32.0–1600.0 kg/m$^3$, further including a crimped margin having a thickness of about 0.5–3.0 mm.

28. A liner for an airstream conduit or housing, comprising:

a pad of fibrous material having a lofty, acoustically insulating portion having a density of between substantially 8.0–80.0 kg/m$^3$ and a relatively higher density skin along a first face thereof, said skin having a thickness of between substantially 0.25–10.0 mm and a density of between substantially 32.0–1600.0 kg/m$^3$, wherein said fibrous material is selected from a group consisting of (a) thermoplastic polymer staple fibers and thermoplastic bicomponent fibers, (b) glass staple fibers and thermoplastic bicomponent fibers and (c) combinations of (a) and (b).

* * * * *